Patented Feb. 11, 1936

2,030,066

UNITED STATES PATENT OFFICE 2,030,066

PLASTIC MATERIAL AND METHOD OF MAKING SAME

Henry Jenett, Cumberland, Md., assignor to Celanese Corporation of America, a corporation of Delaware No Drawing. Application June 29, 1934, Serial No. 732,996

12 Claims. (Cl. 101—32)

This invention relates to fabrics, sheets and the like that are coated, filled or impregnated with a plastic composition which are embossed or surfaced with a design or pattern and more particularly to the method of imparting the design or pattern to the material.

An object of the invention is the economic and expeditious manufacture of coated or impregnated fabrics or sheets that contain a design or pattern, such as a resemblance of leather, embossed into at least one surface of the composite material. Other objects of the invention will appear from the following detailed description.

By employing a mercury bath as the heating medium, in accordance with this invention the composite material, especially those containing a fabric impregnated with a thermoplastic derivative of cellulose, may be heated to as high as 190° C. to prepare them for embossing without showing any signs of blistering. Further, by employing a mercury bath there is no tendency of the plastic material to stick to the heating element or medium, to be pulled from the fabric or other backing or base material.

By employing a mercury bath a much shorter period of heating is required to raise the temperature of the composite sheet or web to the desired degree. The mercury preheating method has very decided advantages in that it offers a mobile metallic surface, which complies with the surface of the plastic coating, or of the fabric backing, or of both; also in that it eliminates airpockets, thereby doing away with non-uniform heating of the material caused by air trapped between the material and metal roll or other heating element generally employed. The mercury carries the heat uniformly and is easily controlled and there is no chance of the plastic adhering to same or blistering. Any desired temperature is quickly imparted to the plastic, this temperature, if high, applied by ordinary heated rolls, could not be gained on short contact, while greatly increased roll temperatures tend to cause the plastic to stick even on very short contact.

Base materials impregnated with a thermoplastic derivative of cellulose may be embossed to yield an effect heretofore not obtainable i. e. in fine grained embossing the raised portions are bright and the low portions dull to less bright lending to the embossed surface a cast that is distinct and noticeable when it is rotated in a beam of light. By this means fabrics coated with a thermoplastic derivative of cellulose may be embossed with a "skiver" finish which more nearly resembles natural skiver finished leather than any artificial material previously made.

According to this invention I form a composite article by coating or impregnating a base material such as fabric, composition board, leather, paper, etc. with a thermoplastic composition which composite material while hot from formation or after preheating is embossed with a roller that is kept cool or cold. The preheating step may according to this invention be performed by submerging or contacting either side of the material in a heated bath of mercury or other metal, metal alloy that has a low melting point or a high boiling liquid.

Such substances as fabric, paper, wood, composition board, metal, or any porous, flexible or rigid articles may be laminated or impregnated with any kind of thermoplastic composition. Thus, a composition having as a base a cellulose ester or ether, with which there may be incorporated plasticizers, oils, pigments, fillers, etc. which may be reduced to a state of homogeneity either by means and methods described in my application Serial No. 641,233, filed November 4, 1932, or by any other method known to the art, may be sheeted by means of calender rolls, or any calender-like equipment and bonded with the article of fabric, paper, etc. by application of heat and pressure.

Any suitable organic thermoplastic compound may be employed as the sheet forming and coating or impregnating substance, in this invention. For instance I may employ derivatives of cellulose, such as cellulose nitrate or organic derivatives of cellulose. The organic derivatives of cellulose may be organic esters of cellulose or cellulose ethers. Examples of organic esters of cellulose are cellulose acetate, cellulose formate, cellulose butyrate and cellulose propionate, while examples of cellulose ethers are ethyl cellulose, methyl cellulose and benzyl cellulose. Thermoplastic compounds other than derivatives of cellulose, such as halogenated rubber, vinyl resins and the like may be employed in this invention.

Any desired modifying agent for the thermoplastic compound may be incorporated therewith. By "modifying agent", I mean any substance which is adapted to impart any desired properties such as softness, elasticity, flexibility, hardness, gloss, color, stability, etc. to the finished product. Such modifying agents may be plasticizers, dyes, pigments, lakes, filling materials, fire retardants, resins, oils, etc.

The choice of plasticizer, if any, employed in the coating material will depend upon the properties of the particular thermoplastic compound employed. The following examples are named as illustrations of the various types of plasticizers that may be employed. Para ethyl toluol sulphonamide, dimethyl phthalates, dibutyl tartrate, diethoxy ethyl phthalate, diethylene glycol ethyl ether ester of phthalic acid, tri-glycol derivatives of phosphoric acid, tricresyl phosphate and camphor. These and similar plasticizers may be employed alone or in combination of two or more and in any suitable quantity.

The thermoplastic material may be formed into a sheet in any suitable manner, then calendered and applied with pressure to the fabric or solid article, or a molding powder may be directly calendered to a sheet-like web and the web applied to the base material, both methods being more fully described in applications Serial Nos. 681,689, filed July 22, 1933 and 718,168, filed March 30, 1934.

The composite material is generally formed by applying a heated web or sheet of thermoplastic material to a preheated fabric or other base and pressing the two together to cause the thermoplastic material to impregnate into or bond with the base material. The composite material may issue from the bonding operation in a highly heated condition, such that the thermoplastic material is soft. In such a condition it may be embossed in accordance with this invention by passing it immediately between two cold or cooled embossing surfaces which impress a design or pattern into the plastic material and at the same time set the material producing a more true pattern. When the design embossed is of a fine nature as in an imitation of leather the embossed design is peculiar in that the crest or highs of the embossed surface is bright while the impressed or lows are less bright which lends to the surface a cast when viewed at certain angles to a source of light. This circumstance gives an embossed artificial material that more nearly matches the appearance of real leather than can be obtained by other commercial methods.

The composite material may be formed, cooled and rolled or otherwise packaged prior to embossing in which case it is necessary to raise the temperature of the material to an extent to soften the thermoplastic compound thereon or therein prior to embossing with a cold or cooled roll. The composite material may be heated in any suitable manner such as passing the same through an oven or passing the same between or around heated rollers or other suitable means. The composite material may be heated from both sides or from either side. For heating the composite material prior to embossing the material may be pulled over or through a bath of mercury or a low melting alloy or high boiling liquid such as high boiling white mineral oil that has no reaction on the thermoplastic material or the base material. The bath may be heated in any suitable manner as by open flame, high pressure steam or by electric resistance or inductance coils. If an oil bath is employed a small amount of oil may be absorbed by the backing which if not excessive lends pliability to the composite material.

The composite material may then be embossed after heating by cold or cooled rolls or other surfaces. If embossing is considered in the light of "displacing" the plastic mass, which is what embossing really amounts to, there is in embossing with a heated embossing surface two phases; heating and displacing, while in employing a cold or cool embossing surface and a preheated composite material there is the heating as a separate step and the embossing including two phases i. e. displacing and setting. The method of displacing the plastic mass and at the same time setting it results in a more sharp and true design or pattern and also in the type, as regards gloss, of the pattern when the same is of a fine character. By this cold roll embossing method the thermoplastic material is actually pressure molded in distinction to being molded by flowing as in hot roll embossing, therefore, the embossed effect is more lasting and more true.

By this invention any suitable design may be permanently and sharply embossed upon the composite material. The design may have the appearance of fabrics, wicker, checks, fine lines, flower designs or an imitation of leathers such as skiver, morroco, snake, lizard, calf and the like.

In embossing fabrics coated with an organic derivative of cellulose, if a preheated fabric is embossed with a cold roll a finish having bright highs and less bright lows is obtained, while embossing cold or partially set material with a hot embossing surface a bright finish is imparted to the surface of the material.

The embossing surface may be any suitable surfaces used for that purpose such as presses, etc. or more preferable a pair of rolls between which the material is pulled. These rolls may be heated or cooled in any suitable manner. Thus in employing cold embossing rolls the same may be cooled by air or water circulating on their interior or flowing on their surface or the rolls may have on their surface or interiors, cooling mediums such as solidified gases known as dry ice, such as carbon dioxide, etc. The embossing surfaces need not be of the same temperature as one may be hot and the other cold or the imprint roll may be of steel or other metal which is cooled while the supporting roll that contacts with the backing of the material may be paper, rubber or like material and may or may not be cooled.

It is to be understood that the foregoing detailed description is given merely by way of illustration and many alterations may be made therein, without departing from the spirit of my invention.

Having described my invention, what I desire to secure by Letters Patent is:

1. Method of producing embossed composite material, containing a thermoplastic composition as a surface, which comprises the steps of heating the material and embossing the heated material between cool surfaces.

2. Method of producing embossed composite material, containing thermoplastic derivatives of cellulose as a surface, which comprises the steps of heating the material and embossing the heated material between cool surfaces.

3. Method of producing embossed composite material, containing thermoplastic cellulose acetate as a surface, which comprises the steps of heating the material and embossing the heated material between cool surfaces.

4. Method of producing embossed sheet composite material which comprises bonding a hot sheet of thermoplastic derivatives of cellulose to a heated base material with heat and pressure and embossing the composite material while at elevated temperature between cool surfaces.

5. Method of producing embossed sheet composite material comprising a base material bonded to a sheet of thermoplastic composition which comprises heating the composite material and embossing the heated material between cooled surfaces.

6. Method of producing embossed sheet composite material comprising a base material bonded to a sheet of thermoplastic organic derivative of cellulose which comprises heating the composite material and embossing the heated material between cooled surfaces.

7. Method of producing embossed sheet composite material comprising a base material bonded to a sheet of thermoplastic composition which comprises drawing the composite material across a heated liquid to raise the temperature of the material and embossing the heated material.

8. Method of producing embossed sheet composite material comprising a base material bonded to a sheet of thermoplastic derivative of cellulose which comprises drawing the composite material across a heated liquid to raise the temperature of the material and embossing the heated material.

9. Method of producing embossed sheet composite material comprising a base material bonded to a sheet of thermoplastic composition which comprises drawing the composite material across a heated mercury bath to raise the temperature of the material and embossing the heated material.

10. Method of producing embossed sheet composite material comprising a base material bonded to a sheet of thermoplastic derivative of cellulose which comprises drawing the composite material across a heated mercury bath to raise the temperature of the material and embossing the heated material.

11. Method of producing embossed sheet composite material comprising a base material bonded to a sheet of thermoplastic composition, which comprises drawing the composite material through a heated mercury bath and embossing the heated composite material between cold surfaces.

12. Method of producing embossed sheet composite material comprising a base material bonded to a sheet of thermoplastic organic derivative of cellulose which comprises drawing the composite material through a heated mercury bath and embossing the heated composite material between cold surfaces.

HENRY JENETT.